US012779699B2

(12) United States Patent
Saito et al.

(10) Patent No.: US 12,779,699 B2
(45) Date of Patent: Nov. 3, 2026

(54) WORK SYSTEM AND WELDING SYSTEM

(71) Applicants: AMADA CO., LTD., Kanagawa (JP); THE UNIVERSITY OF TOKYO, Tokyo (JP)

(72) Inventors: Junichi Saito, Kanagawa (JP); Masashi Kaneko, Kanagawa (JP); Ryota Fukushima, Kanagawa (JP); Rui Fukui, Tokyo (JP); Shinichi Warisawa, Tokyo (JP); Xianyin Hu, Tokyo (JP); Mizuki Ishiguro, Tokyo (JP); Shangyin Zou, Tokyo (JP); Shota Fukui, Tokyo (JP)

(73) Assignees: AMADA CO., LTD., Kanagawa (JP); THE UNIVERSITY OF TOKYO, Tokyo (JP)

( * ) Notice: Subject to any disclaimer, the term of this patent is extended or adjusted under 35 U.S.C. 154(b) by 0 days.

(21) Appl. No.: 19/139,979

(22) PCT Filed: Jan. 9, 2024

(86) PCT No.: PCT/JP2024/000122
§ 371 (c)(1),
(2) Date: Jun. 17, 2025

(87) PCT Pub. No.: WO2024/154604
PCT Pub. Date: Jul. 25, 2024

(65) Prior Publication Data

US 2026/0208361 A1 Jul. 23, 2026

(30) Foreign Application Priority Data

Jan. 16, 2023 (JP) ................................ 2023-004736

(51) Int. Cl.
*B25J 9/16* (2006.01)
*B25J 11/00* (2006.01)
(Continued)

(52) U.S. Cl.
CPC ........... *B25J 9/1697* (2013.01); *B25J 9/1653* (2013.01); *B25J 11/005* (2013.01); *G06T 7/001* (2013.01);
(Continued)

(58) Field of Classification Search
CPC ...... B25J 9/1697; B25J 9/1653; B25J 11/005; G06T 7/001; G06T 7/13; G06T 7/174;
(Continued)

(56) References Cited

U.S. PATENT DOCUMENTS

| | | | | |
|---|---|---|---|---|
| 2015/0278608 | A1 | 10/2015 | Matsumoto | |
| 2017/0123403 | A1* | 5/2017 | Inoue | B25J 9/1684 |
| 2019/0160655 | A1* | 5/2019 | Uemura | B25J 9/1692 |

FOREIGN PATENT DOCUMENTS

| | | | |
|---|---|---|---|
| JP | 5537868 | B2 | 7/2014 |
| JP | 2015186202 | A | 10/2015 |

(Continued)

OTHER PUBLICATIONS

International Search Report for corresponding International Application No. PCT/JP2024/000122 mailed Apr. 2, 2024.
(Continued)

*Primary Examiner* — Bao Long T Nguyen
(74) *Attorney, Agent, or Firm* — Renner, Otto, Boisselle & Sklar, LLP

(57) ABSTRACT

A welding system includes a welding device including a welding head, and configured to move the welding head to a welding position and perform a welding process on a workpiece using the welding head based on an operation program, a control unit configured to execute the operation program to control the welding device, an imaging device configured to image an image of the welding position and its surroundings to output the welding position image, an image processing unit configured to input the welding position
(Continued)

image and a reference image at a reference welding position to which the welding head is to be moved according to the operation program, calculate a correction amount between the welding position shown in the welding position image and the reference welding position, and a confidence level of the welding position, and output an image for confirming the welding position, a display unit configured to display the output image, and a program correction unit configured to correct the operation program based on the output correction amount and confidence level.

8 Claims, 8 Drawing Sheets

(51) Int. Cl.

| | |
|---|---|
| ***G06T 7/00*** | (2017.01) |
| ***G06T 7/13*** | (2017.01) |
| ***G06T 7/174*** | (2017.01) |
| ***G06T 7/73*** | (2017.01) |

(52) U.S. Cl.
CPC ................ *G06T 7/13* (2017.01); *G06T 7/174* (2017.01); *G06T 7/74* (2017.01); *G06T 2207/10024* (2013.01); *G06T 2207/20081* (2013.01); *G06T 2207/30164* (2013.01)

(58) Field of Classification Search
CPC ............. G06T 7/74; G06T 2207/10024; G06T 2207/20081; G06T 2207/30164
See application file for complete search history.

(56) References Cited

FOREIGN PATENT DOCUMENTS

| | | | |
|---|---|---|---|
| JP | 2022532238 | A | 7/2022 |
| JP | 2023001642 | A | 1/2023 |
| WO | 2020_236624 | A1 | 11/2020 |

OTHER PUBLICATIONS

Written Opinion for corresponding International Application No. PCT/JP2024/000122 mailed Apr. 2, 2024.
Extended European Search Report for the corresponding European Application No. 24744527.3, dated Jun. 15, 2026.

* cited by examiner

WORK SYSTEM AND WELDING SYSTEM

This application is a national phase of International Application No. PCT/JP2024/000122 filed Jan. 9, 2024, which claims priority to Japan Application No. 2023-004736 filed Jan. 16, 2023, each of which is hereby incorporated herein by reference in its entirety.

TECHNICAL FIELD

The present invention relates to a work system and a welding system.

BACKGROUND ART

In a welding system equipped with a welding robot, an operation of teaching a welding position of the welding robot is performed in advance. An operation program for the welding robot is created based on a movement route and position coordinates at this time, and welding is performed by the welding robot according to this operation program.

In addition, for the workpieces on which the same welding is to be performed, continuous welding is performed with respect to the same welding position based on the operation program created by the above-described teaching operation. At this time, individual differences such as manufacturing variations in the workpieces may cause a case where the welding position by the welding robot does not match the welding position on the operation program. For this reason, images of the welding positions of the workpieces are imaged by a camera, and the positional deviation from the welding position on the operation program is detected to automatically correct the operation program, before the welding is performed (see Patent Literature 1).

CITATION LIST

Patent Literature

Patent Literature 1: Japanese Patent No. 5537868

SUMMARY

Technical Problem

However, in the conventional welding robot disclosed in Patent Literature 1 described above, variations in the imaged images, differences in the performance of the camera itself, individual differences such as the surface conditions of the workpieces, environmental factors such as a surrounding environment, and human factors such as teaching operations by an operator may result in different edge information extracted for each lot of the workpieces. This causes a difference in the detection accuracy of the welding positions, which may lead to a false detection. In addition, depending on the extracted edge information, multiple peaks appear in the results of pattern matching, or the peaks spread, which may make it impossible to uniquely determine the welding position. In such a case, the operator needs to perform various operations and settings to adjust environmental factors, and to conduct detailed investigations to pursue the causes of the false detection. Because of this makes it impossible to reduce man-hours related to welding.

One aspect of the present invention is a work system and a welding system that can detect a welding position stably and with high accuracy at minimum man-hours, and allows the operator to easily understand reasons for the detection.

Solution to Problem

A work system according to one aspect of the present invention includes: a work device including a target to be controlled, and configured to move the target to be controlled to a predetermined working position and perform a predetermined work using the target to be controlled based on a work program; a control unit configured to execute the work program to control the work device; an imaging device configured to image an image of the working position and surroundings of the working position to output the working position image; an image processing unit configured to input the working position image and a reference image at a reference working position to which the target to be controlled is to be moved according to the work program, calculate a correction amount of the working position corresponding to a distance between the working position shown in the working position image and the reference working position, and a confidence level of the working position (confidence level of the corrected working position), and output an image for confirming the working position; a display unit configured to display the image output from the image processing unit; and a program correction unit configured to correct the work program based on the correction amount and the confidence level output from the image processing unit, in which the image processing unit includes: a first image processing unit configured to generate a first heatmap image showing a distribution of similarity between the working position image and the reference image by matching feature quantities between the working position image and the reference image; a second image processing unit configured to generate a second heatmap image showing a distribution of likelihood of the working position based on the working position image and a learned model; and a third image processing unit configured to synthesize the first heatmap image and the second heatmap image to generate a third heatmap image, and calculate the correction amount and the confidence level of the working position, and the display unit displays the third heatmap image.

A welding system according to one aspect of the present invention includes: a welding device including a welding head, and configured to move the welding head to a welding position and perform a welding process on a workpiece using the welding head based on an operation program; a control unit configured to execute the operation program to control the welding device; an imaging device configured to image an image of the welding position and surroundings of the welding position to output the welding position image; an image processing unit configured to input the welding position image and a reference image at a reference welding position to which the welding head is to be moved according to the operation program, calculate a correction amount of the welding position corresponding to a distance between the welding position shown in the welding position image and the reference welding position, and a confidence level of the welding position, and output an image for confirming the welding position; a display unit configured to display the image output from the image processing unit; and a program correction unit configured to correct the operation program based on the correction amount and the confidence level output from the image processing unit, in which the image processing unit includes: a first image processing unit configured to generate a first heatmap image showing a distribution of similarity between the welding position image and the reference image by matching feature quantities between the welding position image and the reference image; a second image processing unit configured to generate a second heatmap image showing a distribution of likelihood of the welding position based on the welding position image and a learned model; and a third image processing unit configured to synthesize the first heatmap image and the second heatmap image to generate a third heatmap image, and calculate the correction amount and the confidence level of the welding position, and the display unit displays the third heatmap image.

According to one aspect of the present invention, in the work system, the image processing unit inputs the working position image obtained by imaging the image of the working position of the target to be controlled and surroundings of the working position and a reference image at the reference working position to which the target to be controlled is to be moved according to the work program, calculates a correction amount of the working position corresponding to a distance between the working position shown in the working position image and the reference working position, and a confidence level of the working position, and outputs an image for confirming the working position. In addition, the program correction unit corrects the work program based on the correction amount and the confidence level output from the image processing unit. Therefore, this enables the control unit to execute the corrected work program to control the work device so that the target to be controlled is automatically moved to the corrected working position and a predetermined work is performed, and to confirm the corrected working position along with the confidence level based on the image displayed on the display unit, which makes it possible to detect the working position stably and with high accuracy at minimum man-hours and allow an operator to easily understand the reasons for the detection.

According to one aspect of the present invention, in the welding system, the image processing unit inputs a welding position image obtained by imaging the image of the welding position by the welding head of the welding device and surroundings of the welding position and a reference image at the reference welding position to which the welding head is to be moved according to the operation program, calculates a correction amount of the welding position corresponding to a distance between the welding position shown in the welding position image and the reference welding position, and a confidence level of the welding position, and outputs an image for confirming the welding position. In addition, the program correction unit corrects the operation program based on the correction amount and the confidence level output from the image processing unit. Therefore, this enables the control unit to execute the corrected operation program to control the welding device so that the welding head is automatically moved to the corrected welding position, and to confirm the corrected welding position along with the confidence level based on the image displayed on the display unit, which makes it possible to detect the welding position stably and with high accuracy at minimum man-hours and allow an operator to easily understand the reasons for the detection.

Advantageous Effect of Invention

According to one aspect of the present invention, it is possible to detect the welding position stably and with high accuracy at minimum man-hours, and allow an operator to easily understand the reasons for the detection.

DESCRIPTION OF EMBODIMENT

Figure 1:
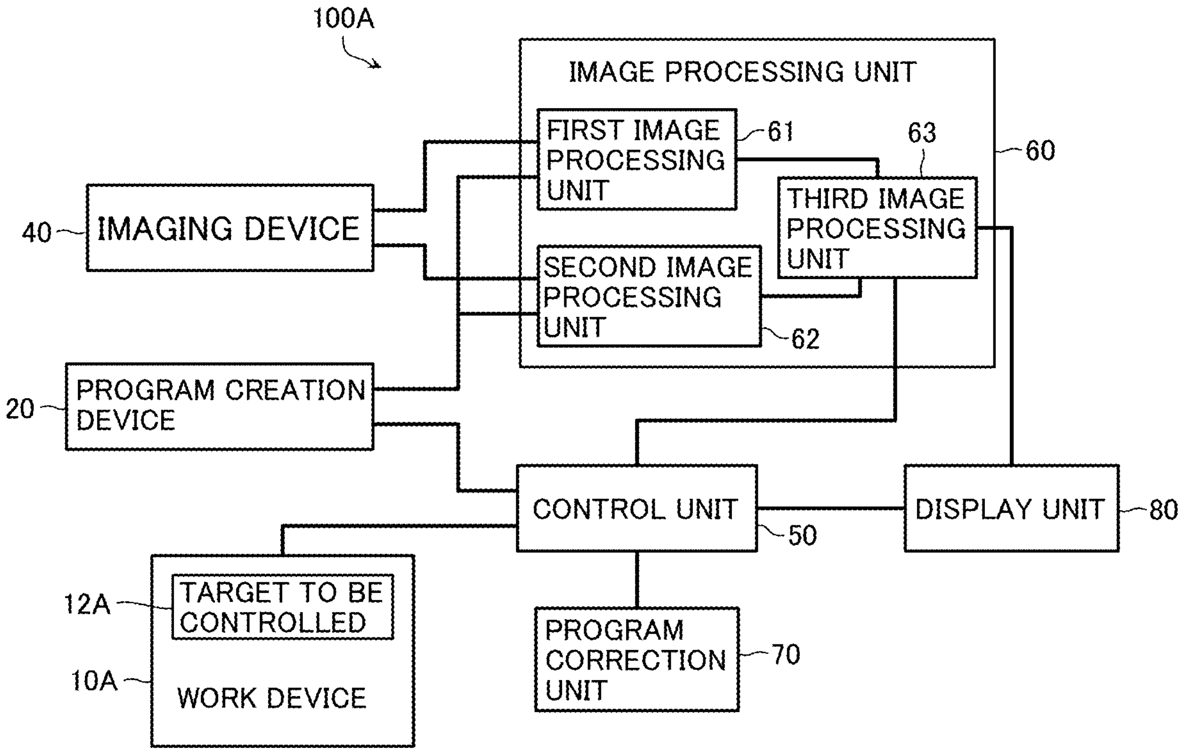
FIG. 1 is a block diagram illustrating a functional configuration of a work system according to one embodiment of the present invention.

Hereinafter, a work system and a welding system according to embodiments of the present invention will be described in detail, with reference to the accompanying drawings. It should be noted that the following embodiments are not intended to limit the invention set forth in the claims, and all combinations of the features described in the embodiments are not necessarily essential for the means for solving the problems of the invention. In addition, in the following embodiments, the same or equivalent components are denoted by the same reference numerals, and redundant description thereof is omitted. Furthermore, in the embodiments, the positional arrangements, scales, dimensions and the like of the components may be exaggerated or diminished and presented differently from those in reality, and some of components may be omitted from the description.

Functional Configuration of Work System

FIG. 1 is a block diagram illustrating a functional configuration of a work system according to one embodiment of the present invention.

As illustrated in FIG. 1, a work system 100A according to one embodiment includes a work device 10A including a target to be controlled 12A, and configured to move the target to be controlled 12A to a predetermined working position and perform a predetermined work using the target to be controlled 12A, a program creation device 20 configured to create a work program for instructing the movement of the target to be controlled 12A and the work performed by the target to be controlled 12A, a control unit 50 configured to execute the work program to control the work device 10A, an imaging device 40 configured to image an image of the working position and its surroundings to output the working position image when the target to be controlled 12A is moved to the working position, an image processing unit 60 configured to input the working position image and a reference image at a reference working position to which the target to be controlled 12A is to be moved according to the work program, calculate a correction amount of the working position corresponding to a distance between the working position shown in the working position image and the reference working position, and a confidence level of the working position, and output an image for confirming the working position, a display unit 80 configured to display the image output from the image processing unit 60, and a program correction unit 70 configured to correct the work program based on the correction amount and the confidence level output from the image processing unit 60.

The image processing unit 60 includes a first image processing unit 61 configured to generate a first heatmap image showing a distribution of similarity between the working position image and the reference image through pattern matching of feature quantities between the working position image and the reference image, a second image processing unit 62 configured to generate a second heatmap image showing a distribution of likelihood of the working position based on the working position image and a learned model, and a third image processing unit 63 configured to synthesize the first heatmap image and the second heatmap image to generate a third heatmap image and calculate the correction amount and the confidence level of the working position. The display unit 80 displays the third heatmap image output from the third image processing unit 63.

Such a work system 100A can be applied to various systems such as a welding system, a machining and processing system, and a transport system.

The following describes an example in which the work system 100A having such a functional configuration is applied to a welding system.

Functional Configuration of Welding System

Figure 2:
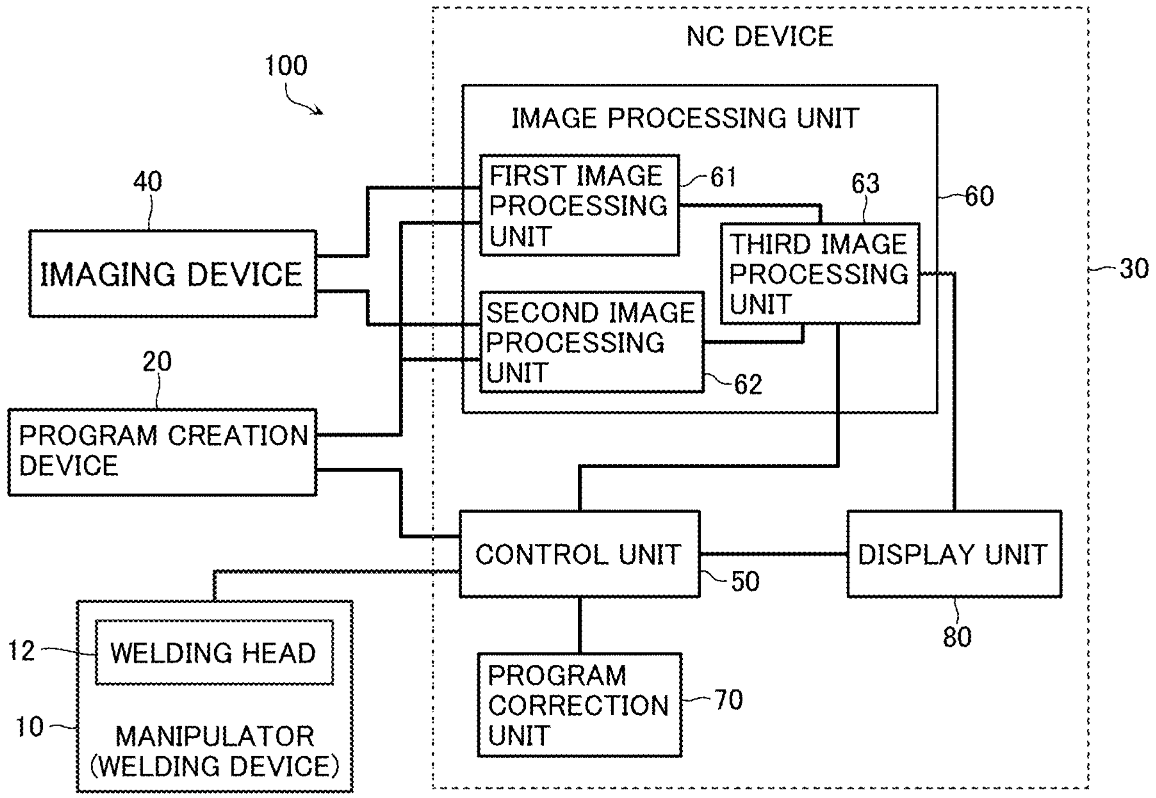
FIG. 2 is a block diagram illustrating a functional configuration of a welding system according to one embodiment of the present invention.

FIG. 2 is a block diagram illustrating a functional configuration of a welding system according to one embodiment of the present invention.

As illustrated in FIG. 2, a welding system 100 according to one embodiment includes a manipulator (welding device) 10 including a welding head 12, and configured to move the welding head 12 to a welding position and perform a welding process on a workpiece using the welding head 12, a program creation device 20 such as computer aided manufacturing (CAM) configured to create an operation program for instructing the movement of the welding head 12 and the welding process performed by the welding head 12, a control unit 50 configured to execute the operation program to control the manipulator (welding device) 10, an imaging device 40 configured to image an image of the welding position and its surroundings to output the welding position image when the welding head 12 is moved to the welding position, an image processing unit 60 configured to input the welding position image and a reference image at a reference welding position to which the welding head 12 is to be moved according to the operation program, calculate a correction amount of the welding position corresponding to a distance between the welding position shown in the welding position image and the reference welding position, and a confidence level of the welding position, and output an image for confirming the welding position, a display unit 80 configured to display the image output from the image processing unit 60, and a program correction unit 70 configured to correct the operation program based on the correction amount and the confidence level output from the image processing unit 60. The above-described control unit 50, the image processing unit 60, the program correction unit 70, and the display unit 80 are included in a numerical control (NC) device 30 that controls the manipulator (welding device) 10 based on the operation program, for example.

The image processing unit 60 includes a first image processing unit 61 configured to generate a first heatmap image showing a distribution of similarity between the working position image and the reference image through template matching of feature quantities between the working position image and the reference image, a second image processing unit 62 configured to generate a second heatmap image showing a distribution of likelihood of the welding position based on the welding position image and a learned model, and a third image processing unit 63 configured to synthesize the first heatmap image and the second heatmap image to generate a third heatmap image and calculate the correction amount and the confidence level of the welding position.

In addition, the program creation device 20 generates a reference image that includes the workpiece and its welding position from the CAM data. The first image processing unit 61 extracts edge information from the welding position image using a first learned model, creates a template image made up of edge information including the welding position from the reference image, and performs template matching on the welding position image using the created template image to generate a first heatmap image showing the similarity between the welding position image and the template image. The second image processing unit 62 generates a second heatmap image showing the likelihood of the welding position based on the welding position image and a second learned model. The third image processing unit 63 weights each of the first heatmap image and the second heatmap image and synthesizes both images, and generates a third heatmap image. The display unit 80 displays the third heatmap image output from the third image processing unit 63 and an operation image for adjusting the weights of the first heatmap image and the second heatmap image. The third image processing unit 63 changes the weights of the first heatmap image and the second heatmap image based on the operation input information through the operation image displayed on the display unit 80, and generates (changes) the third heatmap image displayed on the display unit 80.

Schematic Configuration of Welding System and Flow of Teaching Process

Figure 3:
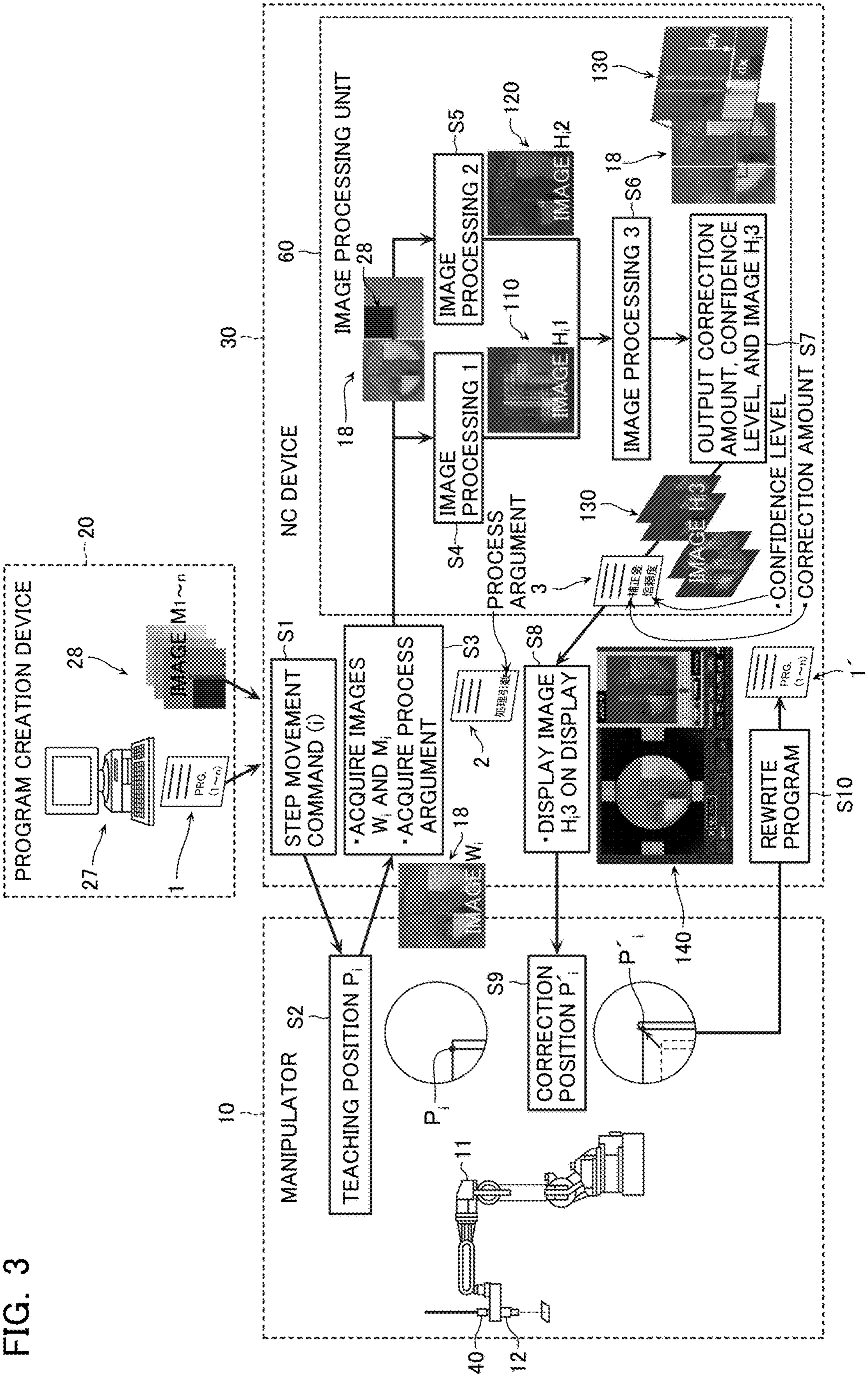
FIG. 3 is an explanatory diagram illustrating a schematic configuration of the welding system and a flow of a teaching process.

FIG. 3 is an explanatory diagram illustrating a schematic configuration of the welding system and a flow of a teaching process.

As illustrated in FIG. 3, the welding system 100 schematically includes the manipulator (welding device) 10, the program creation device 20 that includes a welding CAM 27, and the NC device 30. The manipulator 10, the program creation device 20, and the NC device 30 are communicably connected to each other through a network such as Ethernet.

The manipulator 10 includes a multi-joint robot body 11. The welding head 12 is attached at a distal end of the robot body 11. The welding head 12 is connected to a laser oscillator (not illustrated), for example. The welding head 12 is supplied with a laser beam from the laser oscillator.

As the laser oscillator, for example, a type in which seed light emitted by a laser diode excites and amplifies ytterbium (Yb) or the like in a resonator to emit a laser beam with a predetermined wavelength may be used. In addition, as the laser oscillator, a type that directly uses a laser beam emitted by a laser diode may also be used. Examples of the laser oscillator as a solid-state laser oscillator include a fiber laser oscillator, an yttrium aluminum garnet (YAG) laser oscillator, a disk laser oscillator, and a direct diode laser (DDL) oscillator.

The laser oscillator emits, for example, a laser beam in a 1-μm band with a wavelength of 900 nm to 1100 nm. Specifically, the DDL oscillator emits a laser beam with a wavelength of 910 nm to 950 nm, and the fiber laser oscillator emits a laser beam with a wavelength of 1060 nm to 1080 nm. In addition, a blue semiconductor laser emits a laser beam with a wavelength of 400 nm to 460 nm. A green laser may be the fiber laser oscillator or the DDL oscillator that emits a laser beam with a wavelength of 500 nm to 540 nm, or may be a multi-wavelength resonator optically synthesized with the laser beam L in a 1-μm band.

The imaging device (camera) 40 is attached to the welding head 12 of the manipulator 10 in the present embodiment, but is not limited thereto and can be provided at any location other than the welding head 12. Here, the imaging device 40 may be arranged to face the same direction as the emission direction of the laser beam in the welding head 12 via optical elements such as a bend mirror, or may be arranged coaxially with the emission axis of the laser beam. The imaging device 40 may be configured, for example, with a monocular camera including a low-cost and highly versatile imaging element such as a charge coupled device (CCD) or a complementary metal oxide semiconductor (CMOS).

The imaging device 40 is configured to be able to image a welding position image (image W) 18 with a welding position P (which may also be a representative welding point) of the workpiece as the center of the imaged image. In this case, it becomes possible to recognize the position coordinates of the center of the welding position image (image W) 18 as the position coordinates of the welding position P. The imaging device 40 only needs to have the capability to be able to image an image of the surrounding area including the irradiation position of the laser beam by the welding head 12, for example, at least as a grayscale two-dimensional image. For the welding position image (image W) 18 imaged by the imaging device 40, various calibrations have been performed in advance, and a luminance optimization process such as a high dynamic range (HDR) process and the like is also assumed to be applied. The welding position image (image W) 18 imaged by the imaging device 40 is transferred to the NC device 30. Note that the representative welding point refers to a welding position that includes at least one of a start position and an end position of the welding process of a weld joint in the workpiece.

The program creation device 20 is configured to be able to create various programs offline. The program creation device 20 includes a welding CAM 27. The welding CAM 27 creates operation programs (PRG. (1 to n)) 1 of the manipulator 10 corresponding to all welding steps i (0<i<=n: n is a positive integer, the same applies hereinafter) based on the product data of the workpiece such as computer aided design (CAD) data.

In addition, the program creation device 20 generates virtual reference images for simulation (images $M_{1\ to\ n}$) 28 corresponding to the respective created operation programs 1 based on the product data of the welding CAM 27. The reference image (image M) 28 is an image that can display the reference welding position to which the welding head 12 is to be moved according to the operation program 1, and is formed in a size equivalent to the welding position image (image W) 18 imaged by the imaging device 40 mounted on the manipulator 10. The operation program 1 and the reference image (image M) 28 are transferred from the program creation device 20 to the NC device 30.

The NC device 30 has a function of controlling the entire welding system 100 including the manipulator 10. The control unit 50 of the NC device 30 acquires the operation program 1 and the reference image (image M) from the program creation device 20 in the teaching process. The control unit 50 outputs, to the manipulator 10, a step movement command (i) for the teaching position (welding position) $P_i$ in a welding step i according to the operation program 1 (S1).

When the manipulator 10 reaches the teaching position (welding position) $P_i$ (S2), the imaging device 40 images a welding position image (image $W_i$) 18 and transfers the welding position image (image $W_i$) 18 to the NC device 30. Note that the above-described luminance optimization process such as the HDR process may be applied to the welding position image (image $W_i$) 18 in the NC device 30.

The NC device 30 transfers, to the image processing unit 60, the transferred welding position image (image $W_i$) 18 and a reference image (image $M_i$) 28 corresponding to the welding step i along with process argument data 2 preset in the NC device 30. The image processing unit 60 acquires the welding position image (image $W_i$) 18, the reference image (image $M_i$), and the process argument data 2 (S3), and as multiple image processing tasks based on these, the first to third image processing units 61 to 63 perform image processing 1 (first image processing) (S4), image processing 2 (second image processing) (S5), and image processing 3 (third image processing) (S6), which will be described later, respectively.

Figure 5:
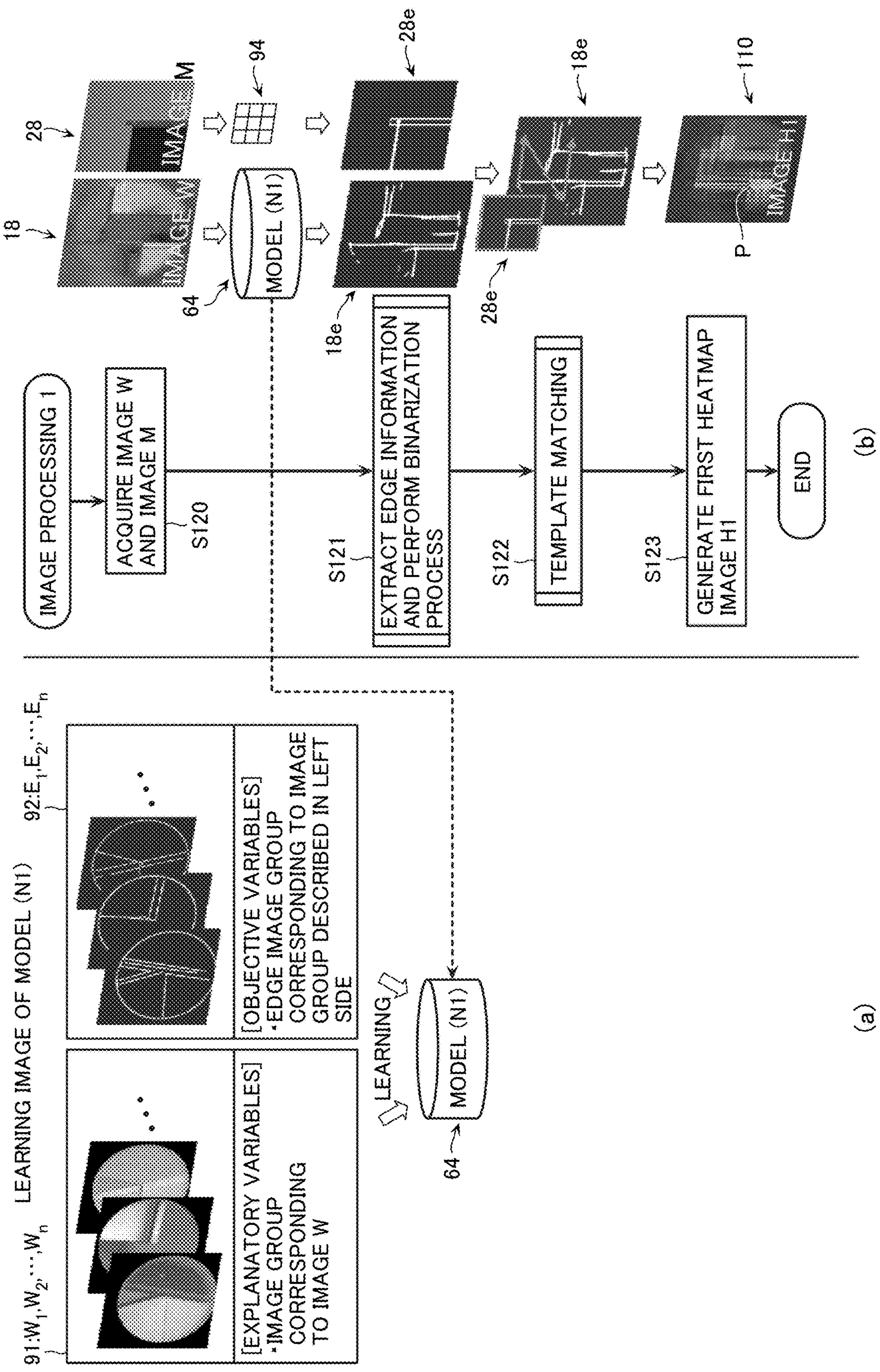
FIG. 5 is an explanatory diagram illustrating an overview of image processing 1 in an image processing unit.

In the image processing 1 (S4) in the first image processing unit 61, the image processing unit 60 uses a first learning model (model (N1), FIG. 5) 64 to extract edges from the welding position image (image $W_i$) 18 and the reference image (image $M_i$) 28 and generate a first heatmap image (image $H_i$1) 110 that represents the distribution of similarity between those images. In addition, in the image processing 2 (S5) in the second image processing unit 62, the image processing unit 60 uses a second learning model (model (N2), FIG. 6) 65 to generate a second heatmap image ($H_i$2) 120 that represents the distribution of "likeness of welding position (likelihood)".

Furthermore, in the image processing 3 (S6) in the third image processing unit 63, the image processing unit 60 generates a third heatmap image ($H_i$3) 130 by applying weights ($W_1$, $W_2$) to the first heatmap image ($H_i$l) and the second heatmap image ($H_i$2), respectively, and synthesizing the first heatmap image ($H_i$l) and the second heatmap image ($H_i$2) using arithmetic calculations such as addition, and calculates a correction amount (dx, dy) and a confidence level of the welding position Pi displayed based on the third heatmap image ($H_i$3) 130 (S7).

Data 3 including the correction amount and the confidence level obtained in this way and an image 140 including the third heatmap image ($H_i$3) 130 are output from the image processing unit 60 to the display unit 80, and the image 140 including the third heatmap image ($H_i$3) is displayed on the display unit 80 (S8). In addition, the control unit 50 outputs, to the manipulator 10, a correction movement command for a correction position (welding position) $P'_i$ in the welding step i according to the correction amount of the data 3.

When the manipulator 10 moves to the correction position (welding position) $P'_i$ (S9), and the correction of the welding position is completed, the program correction unit 70 of the NC device 30 reflects and rewrites the correction amount of the data 3 in the operation program 1 (S10), and creates the updated operation program 1', and the above-described teaching process is performed for the next welding step i+1. Note that for example, in a case of continuous curved welding, the welding step i is provided in association with the number of welding positions (representative welding points) P including the required number of interpolation points between the start position and the end position of the welding.

Hardware Configuration

Figure 4:
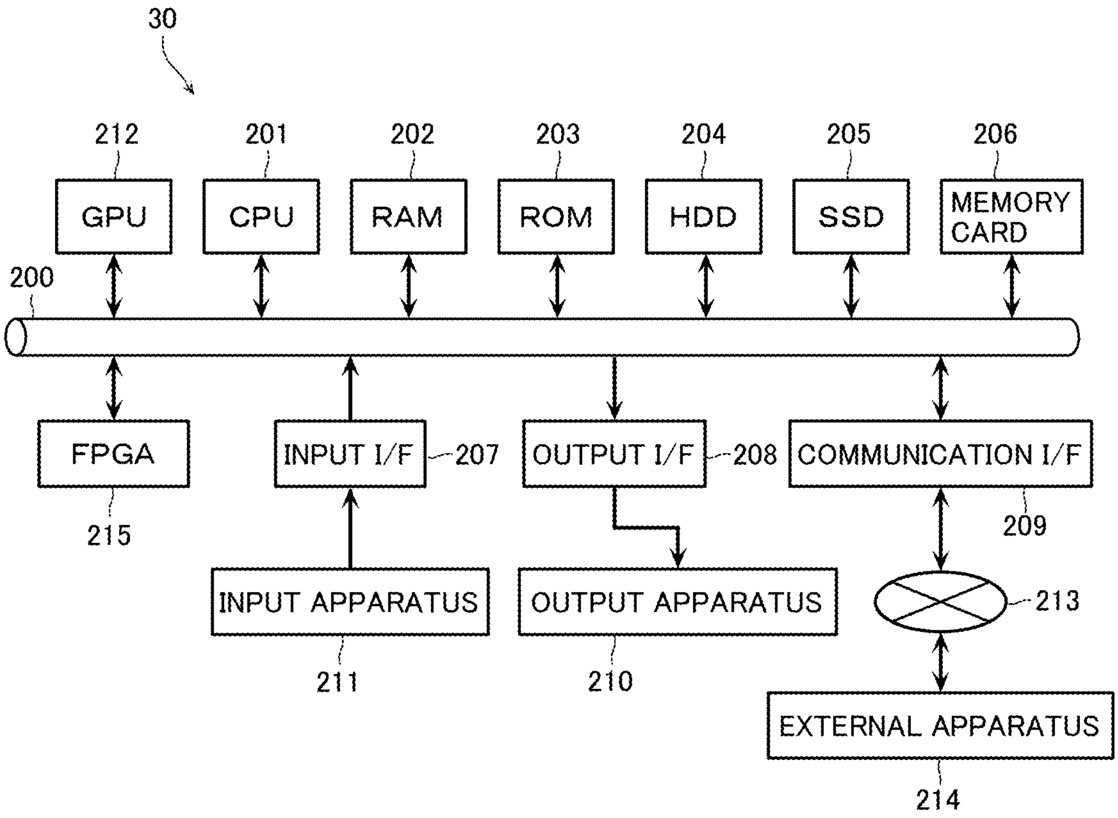
FIG. 4 is an explanatory diagram illustrating a basic hardware configuration of an NC device.

FIG. 4 is an explanatory diagram illustrating a basic hardware configuration of the NC device.

As illustrated in FIG. 4, the NC device 30 is achieved by hardware including, for example, a graphics processing unit (GPU) 212, a central processing unit (CPU) 201, a random access memory (RAM) 202, a read only memory (ROM) 203, a hard disk drive (HDD) 204, a solid state drive (SSD) 205, a memory card 206, and a field programmable gate array (FPGA) 215.

In addition, the NC device 30 includes various interfaces including, for example, an input interface (I/F) 207, an output interface (I/F) 208, and a communication interface (I/F) 209. The components 201 to 209, and 215 of the hardware are connected to one another via a bus 200.

The Input I/F 207 can be connected with an input apparatus 211 including various sensors such as an infrared ray sensor, a temperature sensor, an optical sensor, an acoustic sensor, an image sensor, and a spectral sensor, and an imaging device 40, in addition to various input devices such as a keyboard, a mouse, and a touch panel. The output I/F 208 can be connected with an output apparatus 210 including a notification device of various kinds of information such as a speaker and a lamp (which are not illustrated) in addition to the display unit 90 that displays information such as the image 140, the correction amount and the confidence level of the data 3. The communication I/F 209 communicates with external apparatuses 214 including the program creation device 20 and a server through a network 213 such as Ethernet and the Internet. Note that each component of the program creation device 20 and the welding CAM 27 can be also configured with such a hardware configuration, but the hardware configuration is not limited to the above.

Contents of Image Processing 1

FIG. 5 is an explanatory diagram illustrating an overview of image processing 1 in the image processing unit.

In the image processing 1 in the first image processing unit 61 of the image processing unit 60, as described above, first, edge information is extracted as a feature quantity of each of the welding position image (image W) 18 and the reference image (image M) 28. Various known edge extraction processes (such as processes using an edge extraction filter 94) may be used to extract the edge information, but in the first image processing unit 61 of the present embodiment, the first learning model (model (N1)) 64 created in advance by machine learning such as deep learning (for example, CNN: Convolutional Neural Network or MLP: Multilayer Perceptron) is used to extract the edge information of the welding position image (image W) 18.

That is, the first image processing unit 61 includes a model (N1) (first learning model) 64. In the image processing 1 (first image processing), the first image processing unit 61 inputs at least the welding position image (image W) 18 out of the welding position image (image W) 18 and the reference image (image M) 28 to the model (N1) (first learning model) 64 to extract edge information. However, as described above, the edge information can be extracted by the known edge extraction processes, and therefore, the model (N1) 64 is not essential.

Accordingly, the first learning model (model (N1)) 64 is a learning model created by performing deep learning using, out of the welding position image (image W) 18 and the reference image (image M) 28, at least the welding position image (image W) 18 as the teacher data for explanatory variables, and the edge information of at least the welding position image (image W) 18 as the teacher data for objective variables. Here, the first learning model (first learned model) (model (N1)) 64 is generated by machine learning using the welding position image (image W) 18 as the explanatory variable, and the edge image corresponding to the welding position image (image W) 18 as the objective variable.

FIG. 5(*a*) represents a learning image of the model (N1) 64. The model (N1) 64 is created by performing the deep learning (for example, CNN) inputting a group of images ($W_1$, $W_2$, . . . , $W_n$) 91 corresponding to multiple welding position images (images W) 18 as the teacher data for the explanatory variables, and a group of edge images ($E_1$, $E_2$, . . . , $E_n$) 92 corresponding to the image group 91 of these welding position images (images W) 18 as the teacher data for the objective variables as indicated by outlined arrows in FIG. 5(*a*). Note that the reference image (image M) 28 is generated based on the product data, and therefore, sufficient edge information can be extracted by the known edge extraction processes without using the model (N1) 64, but, if necessary, the deep learning based on the above-described group of images related to the reference image (image M) 28 may be performed for the model (N1) 64 so that the edge information is extracted using the model (N1) 64.

FIG. 5(*b*) represents a process flow and a process image of the image processing 1. The first image processing unit 61 acquires the welding position image (image W) 18 and the reference image (image M) 28 in the image processing 1 (step S120). The welding position image (image W) 18 is then input to the model (N1) 64 as indicated by the outlined arrow in FIG. 5(*b*), and the reference image (image M) 28 is processed through the edge extraction filter 94 as indicated by the outlined arrow in FIG. 5(*b*), and then the edge information is extracted as the feature quantity of each of the welding position image (image W) 18 and the reference image (image M) 28 and a binarization process is performed (step S121), whereby a image to be processed 18*e* including the edge information of the welding position image (image W) 18 is obtained and a template image 28*e* including the edge information of the reference image (image M) 28 is generated (created) as indicated by the outlined arrows in FIG. 5(*b*).

The template image 28*e* created in this way is subjected to template matching as pattern matching while shifting its position against the obtained image to be processed 18*e*, as indicated by the outlined arrow in FIG. 5(*b*) (step S122). As a result, as indicated by the outlined arrows in FIG. 5(*b*), the similarity based on the edge information between the welding position image (image W) 18 and the template image 28*e* is obtained for each pixel or several pixels of the welding position image (image W) 18. This generates the first heatmap image (H1) 110 showing the distribution of the similarity (step S123).

Contents of Image Processing 2

Figure 6:
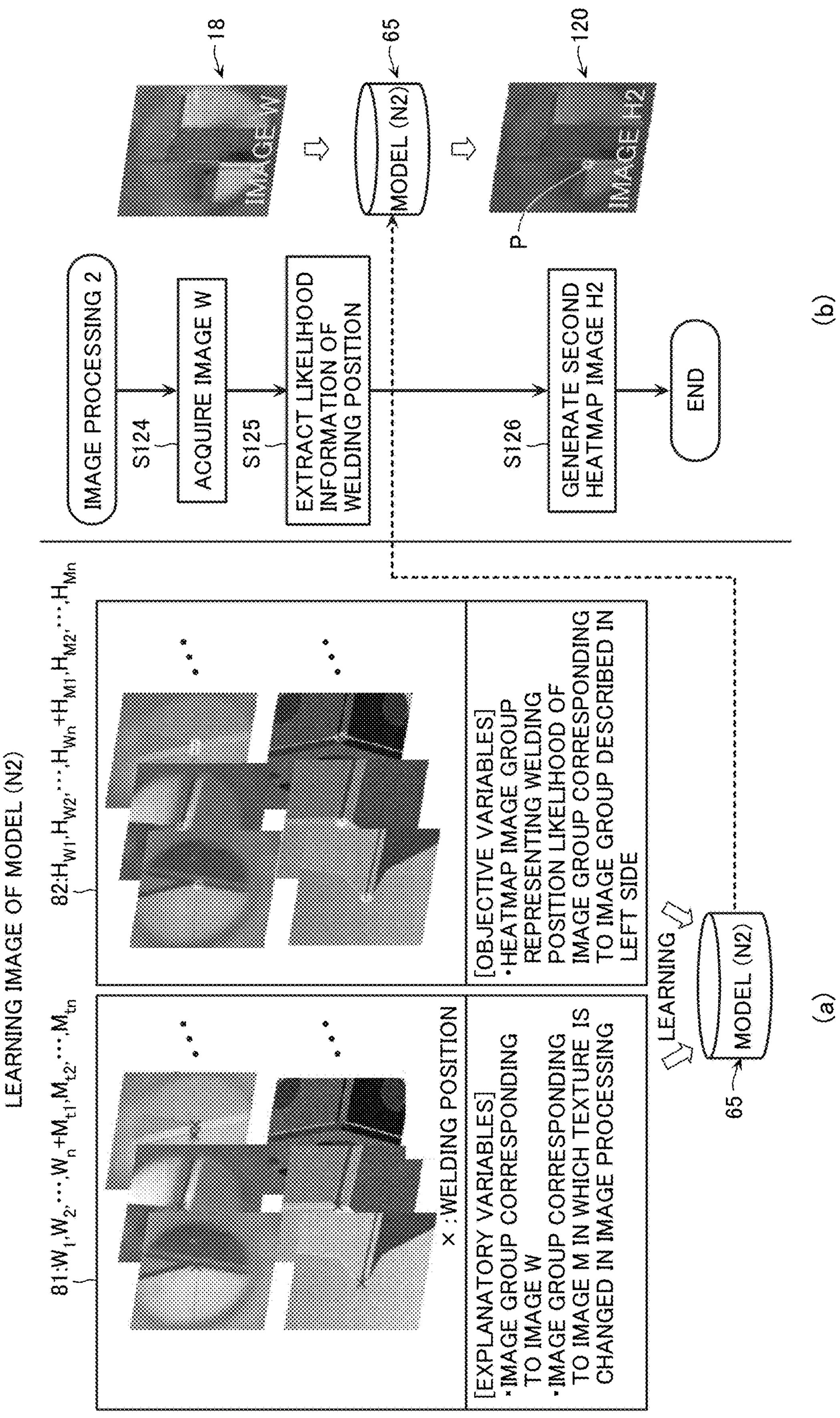
FIG. 6 is an explanatory diagram illustrating an overview of image processing 2 in the image processing unit.

FIG. 6 is an explanatory diagram illustrating an overview of the image processing 2 in the image processing unit.

In the image processing 2 in the second image processing unit 62 of the image processing unit 60, the second learning model (model (N2)) 65 created in advance by the deep learning (CNN or FCN) is used. That is, the second learning model (the second learned model) (model (N2)) 65 is a learning model generated by machine learning (deep learning) using the welding position image (image W) 18 as the explanatory variable and a heatmap image indicating the likelihood of the welding position corresponding to the welding position image (image W) 18 as the objective variable. However, here, the teacher data for the explanatory variables includes not only the welding position image (image W) 18 imaged by the imaging device 40, but also the reference image (image M) 28 generated from the CAM data. That is, the texture information is added to the reference image (image M) 28, or the texture information of the reference image (image M) 28 is changed, to approximate a texture similar to that of the welding position image (image W) 18. The addition or change of this texture information includes adding texture information such as shadows and pseudo-noise to the reference image (image M) 28, and changing the texture information by adding pseudo-noise similar to that of the welding position image (image W) 18 to the texture information such as shadows that are added in advance to the reference image (image M) 28. The second learning model (the second learned model) (model (N2)) 65 is generated by machine learning using the welding position image (image W) 18 and the reference images (image M) 28 to which the texture information is added or whose texture information is changed as explanatory variables and heatmap images indicating the likelihood of the welding positions P corresponding to the welding position image (image W) 18 and the reference images (image M) 28 as objective variables.

FIG. 6(*a*) represents a learning image of the model (N2) 65. The teacher data for the explanatory variables is an image group 81 that includes a group of images ($W_1$, $W_2$, . . . , $W_n$) of multiple welding position images (images W) 18, and a group of images ($M_{t1}$, $M_{t2}$, . . . , $M_{tn}$) of the reference images (images M) 28 to which the texture information is added or whose texture information is changed to approximate the texture similar to that of the welding position image (image W). The teacher data for the objective variables is a heatmap image group 82 representing the likelihood of the welding position P, which includes a heatmap image group ($H_{w1}$, $H_{w2}$, . . . , $H_{wn}$) and a heatmap image group ($H_{M1}$, $H_{M2}$, . . . , $H_{Mn}$) in which the information of the welding position (representative welding point) P in the image group 81 is added to the image group 81. Here, the likelihood of the welding position P may be represented by a Gaussian distribution centered around the welding position P. The model (N2) 65 is created by inputting these pieces of teacher data and performing deep learning (for example, CNN) as indicated by the outlined arrows in FIG. 6(*a*).

Note that in the learning of the model (N2) 65, in order to approximate the texture similar to that of the welding position image (image W) 18, the texture information is added to or changed the reference image (image M) 28 in the image group 81, which makes it possible to create a state in which noise is intentionally added to a plain image generated from the product data. This makes it possible to use a virtual reference image (image M) that is closer to reality, along with the reference welding position included in this image, as the teacher data for explanatory variables, thereby improving the learning efficiency and the accuracy of output results.

FIG. 6(*b*) represents a process flow and a process image of the image processing 2. The second image processing unit 62 acquires the welding position image (image W) 18 in the image processing 2 (step S124). As indicated by the outlined arrow in FIG. 6(*b*), the welding position image (image W) 18 is then input to the model (N2) 65 as data for estimating of the explanatory variables, and the likelihood information of the welding position P (information related to the distribution of likelihood) is extracted (step S125).

Based on the likelihood information extracted in this way, a second heatmap image (H2) 120 in which the welding position P can be displayed in a heatmap is generated (step S126). Note that the likelihood information may be the likelihood score of the welding position P. In this case, the second heatmap image (H2) 120 can be generated based on the distribution of the likelihood scores of the welding position P for each pixel or each group of pixels in the welding position image (image W) 18 obtained by the second learning model (model (N2)) 65.

Although not illustrated, the model (N2) 65 may be created by other deep learning methods. In addition, the second learning model (model (N2)) 65 may be a learning model created by inputting subdivided partial images of the welding position image (image W) 18 and the reference image (image M) 28 and labels with scores assigned for the presence or absence of the welding positions P in the subdivided partial images as the teaching data for the explanatory variables, and the heatmap information representing the position distribution of the welding positions P based on the labels as the teacher data for the objective variables and performing the deep learning. The second heatmap image (H2) 120 generated in step S126 described above can be generated based on the score of the label of the welding position P obtained by the second learning model (model (N2)) 65 and its distribution position, the welding position P being represented when the partial images of the welding position image (image W) are recombined.

Contents of Image Processing 3

Figure 7:
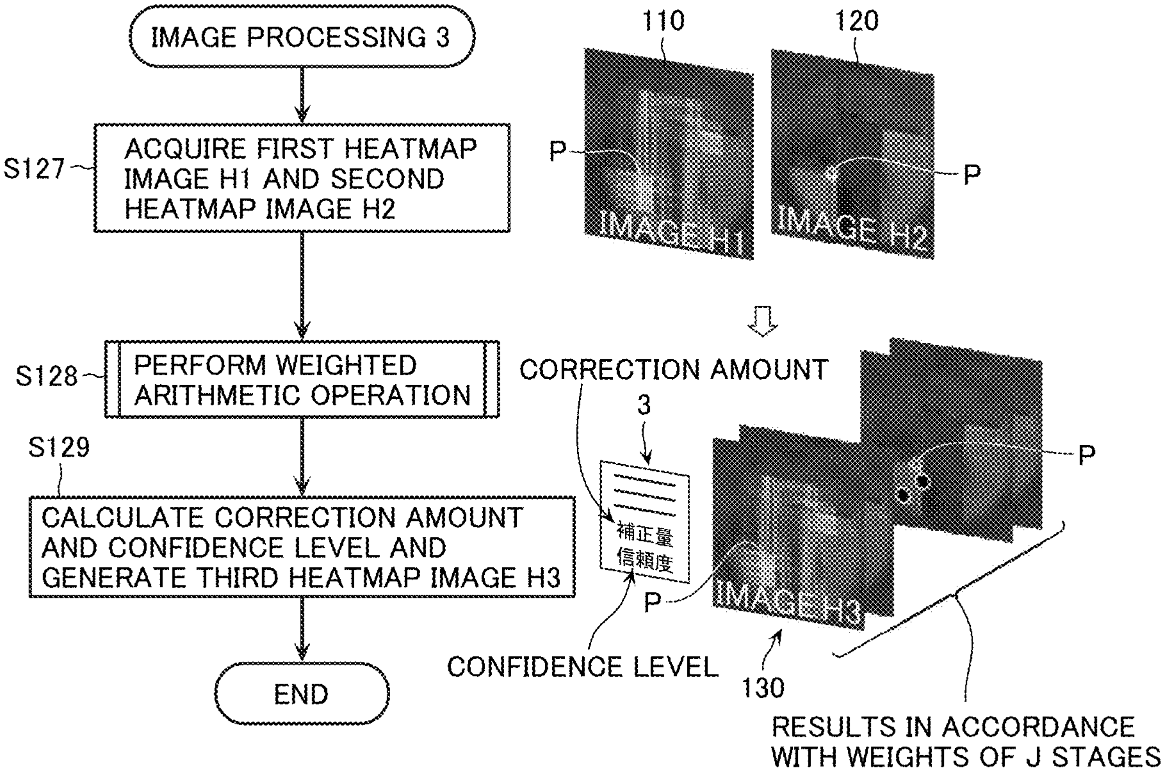
FIG. 7 is an explanatory diagram illustrating an overview of image processing 3 in the image processing unit.

FIG. 7 is an explanatory diagram illustrating an overview of the image processing 3 in the image processing unit.

In the image processing 3 in the third image processing unit 63 of the image processing unit 60, first, the first heatmap image (H1) 110 generated in the image processing 1 and the second heatmap image (H2) 120 generated in the image processing 2 are acquired (step S127).

Next, a weighted arithmetic operation process is performed in which a weight ($W_1$) is applied to the first heatmap image (H1) 110 and a weight ($W_2$) is applied to the second heatmap image (H2) 120 and the first heatmap image (H1) 110 and the second heatmap image (H2) 120 are synthesized (for example, addition) (step S128), and as indicated by the outlined arrow in FIG. 7, a third heatmap image (H3) 130 is generated by synthesizing the first heatmap image (H1) 110 and the second heatmap image (H2) 120, and the correction amount of the welding position P corresponding to a distance between the welding position P represented in the welding position image (image W) 18 which may be represented in this way and the reference welding position, and the confidence level of the welding position P are calculated (step S129). Here, the "confidence level" refers to the evaluation point (or score) for the correction position (corrected welding position P).

The reason why the weights ($W_1$, $W_2$) are applied to the first heatmap image (H1) 110 and the second heatmap image (H2) 120, respectively, and the first heatmap image (H1) 110 and the second heatmap image (H2) 120 are synthesized is as follows. That is, the noise caused by environmental factors such as the brightness of the working position and the arrangement of jigs, material factors such as external scratches, and human factors such as the settings of the imaging device 40 affects the first heat map image (H1) and the second heat map image (H2) differently depending on the type of noise. For this reason, the weight of the image with less noise influence out of the first heatmap image (H1) and the second heatmap image (H2) is increased to be greater than the weight of the image with more noise influence, which makes it possible to suppress the influence of noise appearing in the third heatmap image (H3). For example, the third heatmap image (H3) 130 can be configured to be able to display results of a group of images based on heatmap information that can display the welding positions P in accordance with the weights of the J stages (where J is a positive integer, for example, 11). The third heatmap image (H3) 130 and an image 140 for confirming the correction amount and the confidence level based on the data 3 (FIG. 3 and FIG. 9) are output in a displayable manner on the display unit 80. In the image 140, for example, the correction position of the welding position P can be displayed overlaid on (in combination with) the welding position image (image W) 18, or the optimal third heatmap image (H3) 130 can be displayed based on the confidence level. Note that the weighted arithmetic operation process in step S128 is not limited to synthesis by addition.

Specific Example of Teaching Process

Figure 8:
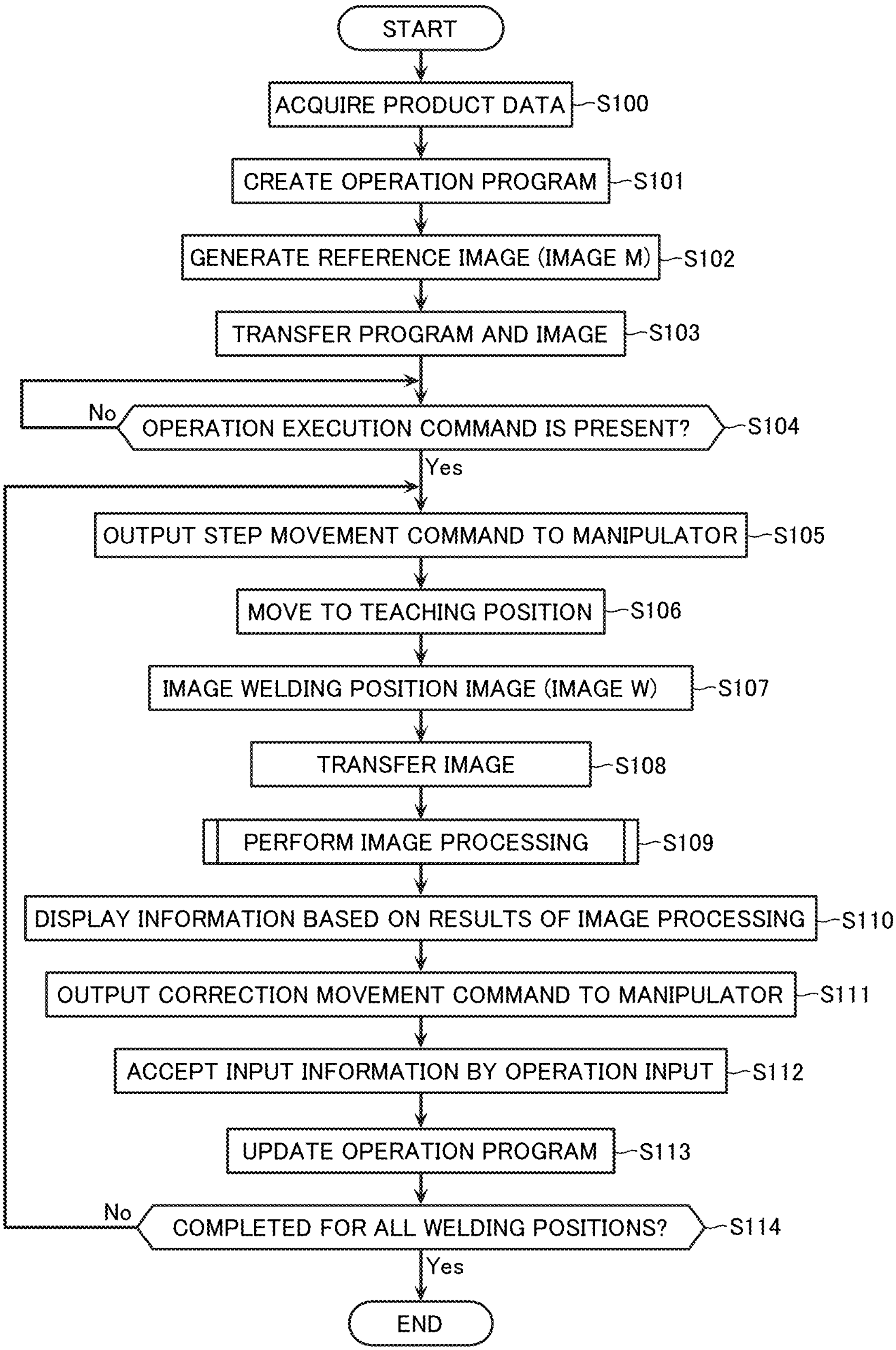
FIG. 8 is a flowchart illustrating a teaching process flow of the welding system.
Figure 9:
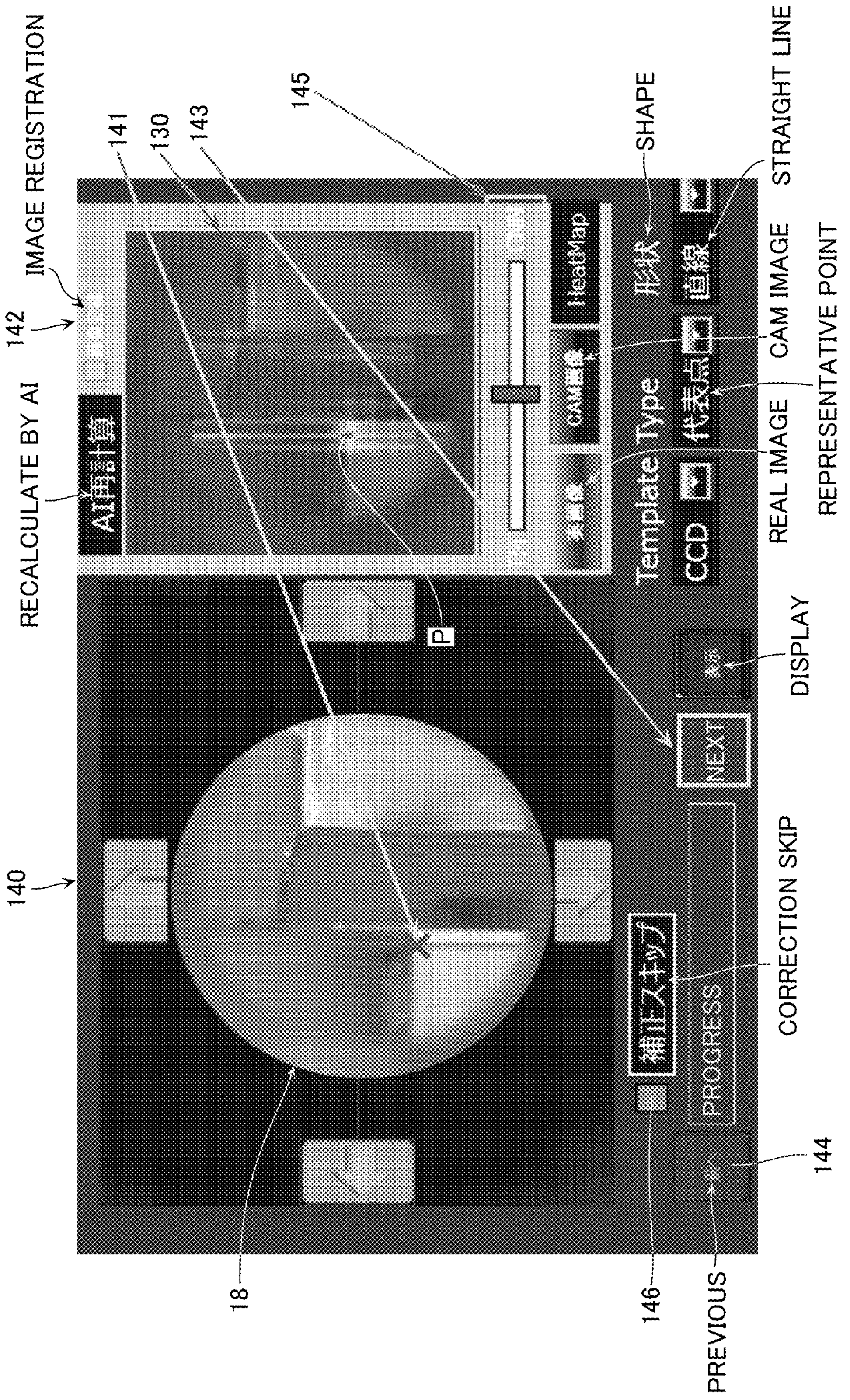
FIG. 9 is a diagram illustrating an example of an image displayed on a display unit.

FIG. 8 is a flowchart illustrating a teaching process flow of the welding system. FIG. 9 is a diagram illustrating an example of an image displayed on the display unit.

As illustrated in FIG. 8, in the welding system 100, first, for the welding, the product data is acquired from a higher-order system (for example, a CAD system) by the program creation device 20 (step S100).

After acquiring the product data, the welding CAM 27 of the program creation device 20 creates the operation program 1 of the manipulator 10 as described above (step S101) and generates a reference image (image M) 28 corresponding to all welding steps (step S102). The program creation device 20 then transfers the created operation program 1 and the reference image (image M) 28 to the NC device (step S103).

The NC device 30 waits for an operation execution command for the teaching process based on input from the input apparatus 211 such as a button operation by the operator (No in step S104), and if the operation execution command is accepted (Yes in step S104), the NC device 30 outputs the step movement command to the manipulator 10 (step S105). The manipulator 10 moves to the teaching position of the welding position P based on the step movement command (step S106), and the imaging device 40 images an image of the welding position image (image W) 18 (step S107).

The imaged welding position image (image W) 18 is transferred to the NC device 30 (step S108), and the NC device 30 transfers the transferred welding position image (image W) 18, the reference image (image M) 28, and the process argument data 2 to the image processing unit 60. The image processing unit 60 performs the image processing including the image processing 1 to the image processing 3 as described above in the first to third image processing units 61 to 63 based on these images (step S109), and outputs various kinds of information based on the results of the image processing to the display unit 80. The display unit 80 then displays various kinds of information (for example, the image 140, etc.) (step S110).

At this time, in the image 140 displayed on the display unit 80, for example, the third heatmap image ($H3_J$) 130 based on the J-th confidence level which is the highest confidence level among the confidence levels of the J stages calculated by the image processing may be set to be displayed by default. When such an image 140 is displayed, the NC device 30 outputs a correction movement command to the manipulator 10 (step S111).

Here, the image 140 for confirmation will be described as an example of the information displayed on the display unit 80. As illustrated in FIG. 9, in the image 140, the display unit 80 displays the third heatmap image (H3) 130, and a weight change slider (operation image) 145 for adjusting the weights of the first heatmap image (H1) 110 and the second heatmap image (H2) 120. That is, as illustrated in FIG. 9, in the image 140, the welding position image (image W) 18 in which a correction point marker 141 such as a "x" mark indicating the correction position of the welding position P is indicated is displayed in the area up to about ⅔ from the left side. In addition, in the image 140, a heatmap display column 142 in which a third heatmap image ($H3_J$) 130 that shows the welding position P based on the J-th confidence level as described above is displayed along with the weight change slider 145 for variably displaying the third heatmap image ($H3_J$) 130 while changing the weight (weight balance) is displayed in an area up to about ⅓ from the right side.

In the image 140 displayed on the display unit 80, for example, the operator can adjust the weights (the weights of the first heatmap image (H1) 110 and the second heatmap image (H2) 120) applied to the third heatmap image (H3) 130 by moving the weight change slider 145 either to the left or right. As a result, the third image processing unit 63 changes the weights of the first heatmap image (H1) 110 and the second heatmap image (H2) 120 based on the operation input information via the weight change slider (operation image) 135, and generates the third heatmap image (H3) 130, allowing the third heatmap image (H3) corresponding to the changed weights to be displayed in the heatmap display column 142. Along with this, the correction point marker 141, which varies in display location according to the correction amount of the welding position P of this third heatmap image (H3), can be also displayed on the welding position image (image W) 18. In addition, the correction point marker 141 can be moved to any display location through an operator's operation input. In this case, the correction amount represented by the display location of the moved correction point marker 141 can be recognized as the correction amount of the welding position P.

The operator can return to the display of the image 140 in the previous welding step by operating a "Previous" button 144 displayed on the image 140, and by operating a "Next" button 143, can determine the correction amount of the welding position P calculated based on the position coordinates of the display location of the correction point marker 141, allowing the transition to the display of the image 140 in the next welding step. Checking a "Correction Skip" checkbox 146 and operating the "Next" button 143 makes it possible to skip the confirmation of the position correction of the welding position P in the relevant welding step. In addition, when a correction process is performed, the evaluation point of the confidence level of the correction position is compared with a predetermined threshold, and the correction process may be performed when the evaluation point of the confidence level is above the threshold, and a process such as alarm notification may be performed when the evaluation point of the confidence level falls below the threshold.

Returning to FIG. 8, when the manipulator 10 moves to the correction position, upon reception of the input information through the operator's operation input on the image 140 displayed as described above (step S112), and the operation program 1 is rewritten and updated in a state in which the calculated correction amount is reflected (step S113). Thereafter, it is determined whether the teaching of the welding position P in all the welding steps has been completed (step S114), and if the teaching is determined to be completed (Yes in step S114), a series of processes according to this flowchart ends. On the other hand, if the teaching is determined not to be completed (No in step S114), the process transitions to step S105 described above, the manipulator 10 is moved to the next welding step, and the subsequent processes are repeated.

As described above, the welding system 100 applying the work system 100A creates a template image 28*e* made up of edge information of the reference image (image M) 28, which is a virtual image for simulation, in the image processing 1, extracts the edge information from the welding position image (image W) 18 imaged by the imaging device 40 using the model (N1) 64, and performs the template matching, for example. The reference image (image M) 28 is an image that allows for an ideal simulation that is not influenced by the environmental and human factors that could lead to the above-described problems. This makes it possible to obtain results based on the similarity of images in response to changes in the welding position images (image W) 18 for each lot, starting from the first lot of the welding process, and to generate the first heatmap image (H1) 110.

In addition, in the image processing 2, using the model (N2) 65 that has learned the likeness of the welding position (likelihood), a second heatmap image (H2) 120 that can infer the welding position P of the welding position image (image W) 18 is generated.

Therefore, the second heatmap image (H2) 120 can be output as a heatmap that can objectively express the candidates for the welding positions that can be recognized or identified by the user (operator) based on the distribution of likelihood of the welding position P. Examples of the material factors described above include external scratches that affect the surface conditions of the workpiece, but such external scratches are concerned to act as noise which may affect the results of the distribution in terms of the similarity of images such as the first heatmap image (H1) 110. On the other hand, the likeness of the welding position (likelihood) of the second heatmap image (H2) 120 has been found to have a low sensitivity to external scratches, making it difficult to affect the results of the distribution. Accordingly, by also using the second heatmap image (H2) 120, the results of the distribution are not easily affected by the environmental factors when an image is imaged by the imaging device 40, and similar locations of the welding position P, which may be difficult to identify with only the first heatmap image (H1) 110 in the image processing 1 can be easily identified.

In the image processing 3, a weighted arithmetic operation is performed on the results obtained from the approach of the image processing 1 (first heatmap image (H1) 110) and the results obtained from the approach of the image processing 2 (second heatmap image (H2) 120) to generate the synthesized third heatmap image (H3) 130.

Therefore, for example, even if there is a bias in the results of either image processing 1 or image processing 2, it is possible to generate a third heatmap image (H3) 130 with changed (adjusted) weights for the first heatmap image (H1) 110 and the second heatmap image (H2) 120 based on the operation input information, which makes it possible to display the welding position P with high accuracy in the image 140.

In addition, the information related to the correction amount and the confidence level of the welding position P, calculated together with the third heatmap image (H3) 130, can be displayed in image 140 along with the third heatmap image (H3) 130, which makes it possible to visualize various kinds of information in a form that the user (operator) can easily recognize. This will enable the explanation of the basis for the position correction of the welding position P and various kinds of information, and the effect contributing to a deeper understanding can be expected. In this way, according to the welding system 100, it is possible to detect the welding position P stably and with high accuracy at minimum man-hours, and allow the user (operator) to easily understand the reasons for the detection.

Modifications

The above describes the preferred embodiment of the present invention, but the technical scope of the present invention is not limited to the scope described in one embodiment. Various changes or alterations can be applied to the embodiment described above.

For example, in the embodiment described above, the reference image (image M) 28 is described as being generated based on the product data, but this is not limited thereto. For example, the CCD images imaged by the imaging device 40, similar to the welding position image (image W) 18, the CAD images output from the higher-order CAD system, the depth map images output by a depth camera or artificial intelligence (AI) depth estimation, and images obtained by combining these in various ways may be used as the reference image (image M) 28.

In the image processing 1, the similarity between the welding position image (image W) 18 and the reference image (image M) 28 (template image 28*e*) is described as being determined using edge information of both images through template matching, but this is not limited thereto. Instead of the template matching of the edge information, for example, matching of feature quantities (corners, their intervals, luminance gradients, etc.) or feature points (key points) within each image 18, 28 may be performed. In this case, the extraction and/or matching of key points may use a general-purpose algorithm, or may be performed by AI. The key point matching can be applied to three-dimensional data, such as matching three-dimensional point cloud data acquired by a light cutting method or the like with three-dimensional data group from CAD/CAM, which provides a high versatility.

In addition, in the image processing 2, the second heatmap image (H2) 120 is described as being generated by inputting the reference image (image M) 28, in which the welding position image (image W) 18 and the texture information are added to the model (N2) 65, as data for estimating explanatory variables, but this is not limited thereto. The data for estimating explanatory variables may include various kinds of information such as a CAD image, a depth map image, and weld joint parameters in addition to the reference image (image M) 28. In this case, it is only required that the model (N2) 65 is created by inputting these various kinds of information as teacher data for explanatory variables and performing deep learning or the like.

In addition, the model (N2) 65 may be also a time-series evolutionary model that sequentially adds and learns various kinds of information regarding the results of previous lots as teacher data for explanatory variables, or may be an autonomous development model that autonomously improves performance through deep learning, or the like using data for each lot in the cloud or on a main personal computer (PC) or the like. In the model (N2) 65, the objective variable may not be the heatmap information that can represent the welding position P, but may be only the position coordinates of the welding position P, or a single high-dimensional welding line rather than the welding position P itself. When the welding line is the objective variable, the detected welding line can be detected, for example, by methods such as selecting end points on the line, thereby compressing the dimensions to a lower dimension (pointing). The detection of the weld line can be performed either by machine learning using AI or by matching with the above-described three-dimensional point cloud data. Additionally, it is also possible to configure to display only the correction point marker 141 without providing the heatmap display column 142 in image 140.

The above has described several embodiments of the present invention, but these embodiments are presented as examples and are not intended to limit the scope of the invention. These novel embodiments can be implemented in various other forms, and various omissions, substitutions, and modifications can be made within the scope that does not deviate from the gist of the invention. These embodiments and their modifications are included in the scope and gist of the invention, as well as in the scope of the invention described in the claims and its equivalents.

REFERENCE SIGNS LIST

1 Operation program
2 Process argument data
3 Data
10 Welding device (manipulator)
12 Welding head
18 Welding position image (image W)
20 Program creation device
27 Welding CAM
28 Reference image (image M)
30 NC device
40 Imaging device
50 Control unit
60 Image processing unit
61 First image processing unit
62 Second image processing unit
63 Third image processing unit
70 Program correction unit
80 Display unit
100 Welding system
110 First heatmap image (H1)
120 Second heatmap image (H2)
130 Third heat map image (H3)
140 Image

The invention claimed is:

1. A work system, comprising:

a work device including a target to be controlled, and configured to move the target to be controlled to a predetermined working position and perform a predetermined work using the target to be controlled based on a work program;

a control unit configured to execute the work program to control the work device;

an imaging device configured to image an image of the working position and surroundings of the working position to output the working position image;

an image processing unit configured to input the working position image and a reference image at a reference working position to which the target to be controlled is to be moved according to the work program, calculate a correction amount of the working position corresponding to a distance between the working position shown in the working position image and the reference working position, and a confidence level of the working position, and output an image for confirming the working position;

a display unit configured to display the image output from the image processing unit; and a program correction unit configured to correct the work program based on the correction amount and the confidence level output from the image processing unit, wherein the image processing unit includes:

a first image processing unit configured to generate a first heatmap image showing a distribution of similarity between the working position image and the reference image by matching feature quantities between the working position image and the reference image;

a second image processing unit configured to generate a second heatmap image showing a distribution of likelihood of the working position based on the working position image and a learned model; and a third image processing unit configured to synthesize the first heatmap image and the second heatmap image to generate a third heatmap image, and calculate the correction amount and the confidence level of the working position, and the display unit displays the third heatmap image.

2. A welding system, comprising:

a welding device including a welding head, and configured to move the welding head to a welding position and perform a welding process on a workpiece using the welding head based on an operation program;

a control unit configured to execute the operation program to control the welding device;

an imaging device configured to image an image of the welding position and surroundings of the welding position to output the welding position image;

an image processing unit configured to input the welding position image and a reference image at a reference welding position to which the welding head is to be moved according to the operation program, calculate a correction amount of the welding position corresponding to a distance between the welding position shown in the welding position image and the reference welding position, and a confidence level of the welding position, and output an image for confirming the welding position;

a display unit configured to display the image output from the image processing unit; and a program correction unit configured to correct the operation program based on the correction amount and the confidence level output from the image processing unit, wherein the image processing unit includes:

a first image processing unit configured to generate a first heatmap image showing a distribution of similarity between the welding position image and the reference image by matching feature quantities between the welding position image and the reference image;

a second image processing unit configured to generate a second heatmap image showing a distribution of likelihood of the welding position based on the welding position image and a learned model; and a third image processing unit configured to synthesize the first heatmap image and the second heatmap image to generate a third heatmap image, and calculate the correction amount and the confidence level of the welding position, and the display unit displays the third heatmap image.

3. The welding system according to claim 2, further comprising:

a program creation device configured to create the operation program for instructing movement of the welding head and a welding process performed by the welding head, wherein the program creation device generates a reference image that includes the workpiece and a welding position of the workpiece from CAM data.

4. The welding system according to claim 2, wherein the third image processing unit weights each of the first heatmap image and the second heatmap image and synthesizes the first heatmap image and the second heatmap image, and generates the third heatmap image.

5. The welding system according to claim 2, wherein the first image processing unit extracts edge information using a first learned model from the welding position image, creates a template image made up of the edge information including the welding position from the reference image, and performs template matching on the welding position image using the created template image to generate the first heatmap image showing similarity between the welding position image and the template image, and the second image processing unit generates the second heatmap image indicating likelihood of the welding position based on the welding position image and the second learned model.

6. The welding system according to claim 5, wherein the first learned model is generated by machine learning, using the welding position image as an explanatory variable and an edge image corresponding to the welding position image as an objective variable, and the second learned model is generated by machine learning, using the welding position image as an explanatory variable and a heatmap image indicating likelihood of the welding position corresponding to the welding position image as the objective variable.

7. The welding system according to claim 6, wherein texture information is added to the reference image or texture information of the reference image is changed to approximate a texture similar to the texture of the welding position image, and the second learned model is generated by machine learning, using the welding position image and the reference image as explanatory variables, and heatmap images indicating likelihood of the welding positions corresponding to the welding position image and the reference image as the objective variables.

8. The welding system according to claim 4, wherein the display unit displays the third heatmap image, and an operation image for adjusting weights of the first heatmap image and the second heatmap image, and the third image processing unit changes the weights of the first heatmap image and the second heatmap image based on operation input information through the operation image, and generates the third heatmap image.

* * * * *